April 1, 1952  H. F. CLAPHAM  2,590,839
FABRIC WEAR TESTER
Filed Nov. 20, 1946  3 Sheets-Sheet 1
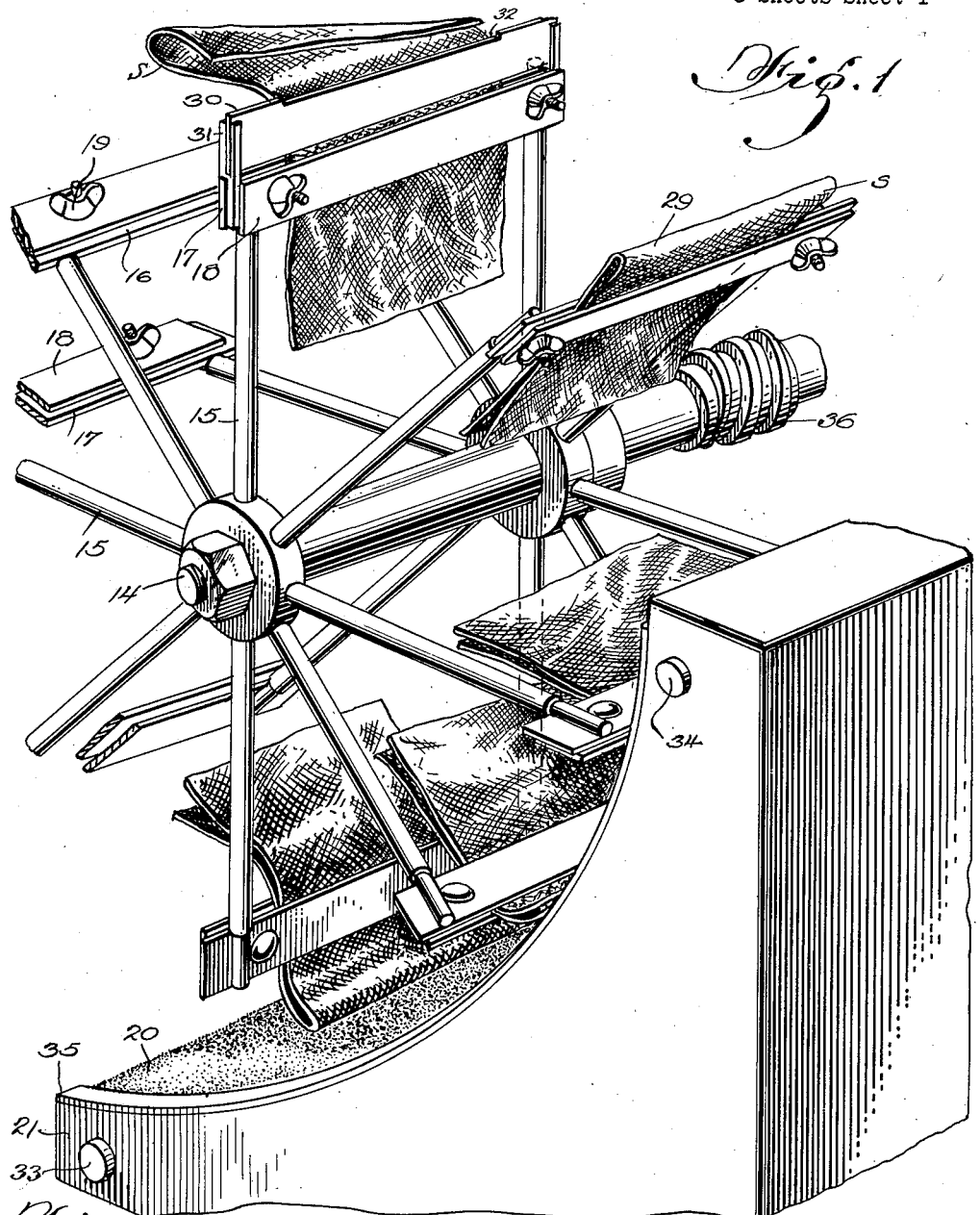
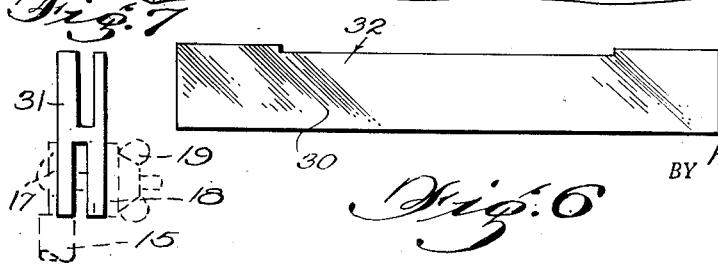
INVENTOR.
BY Harry F. Clapham
W. J. Eccleston,
ATTORNEY

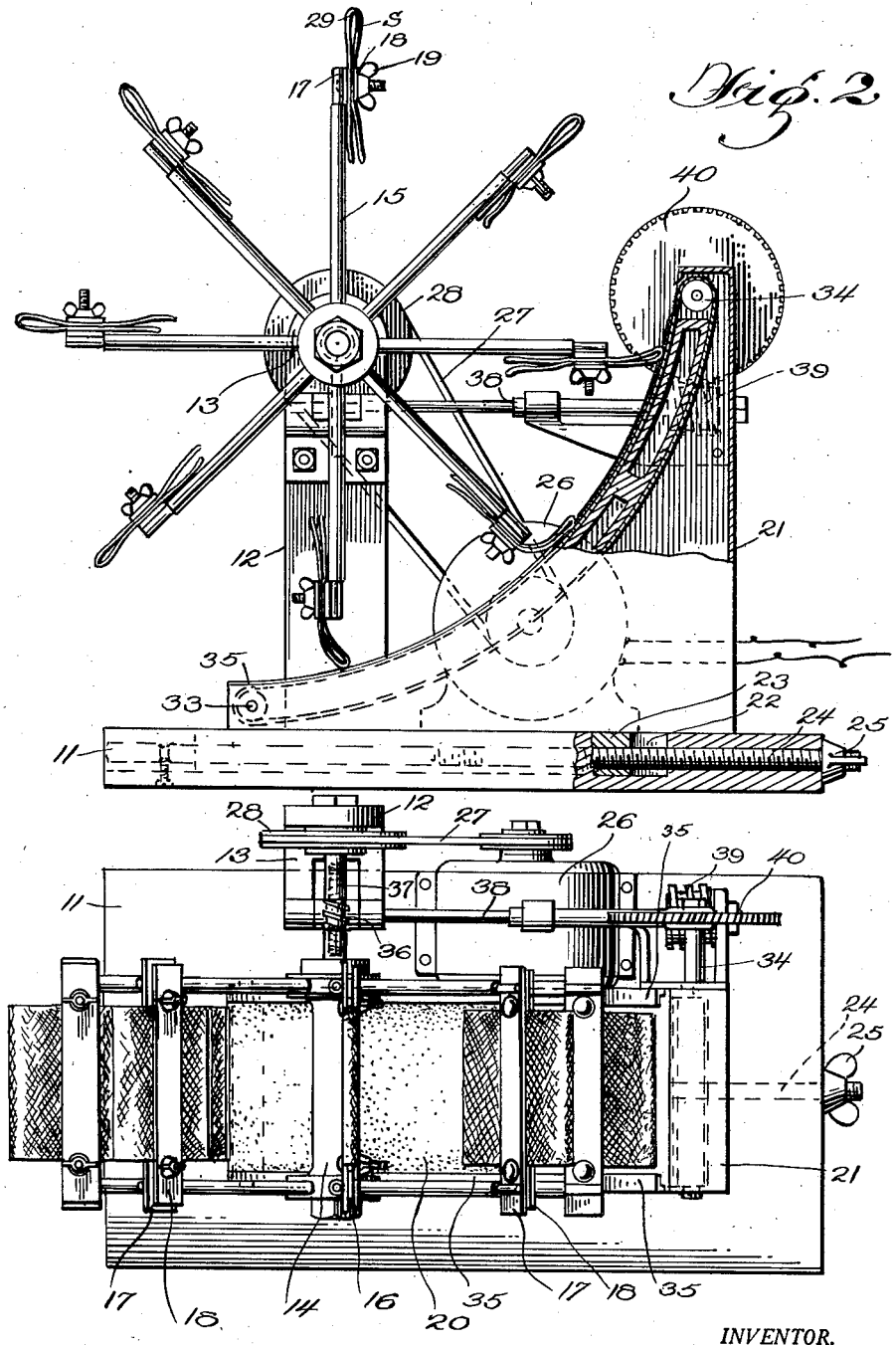

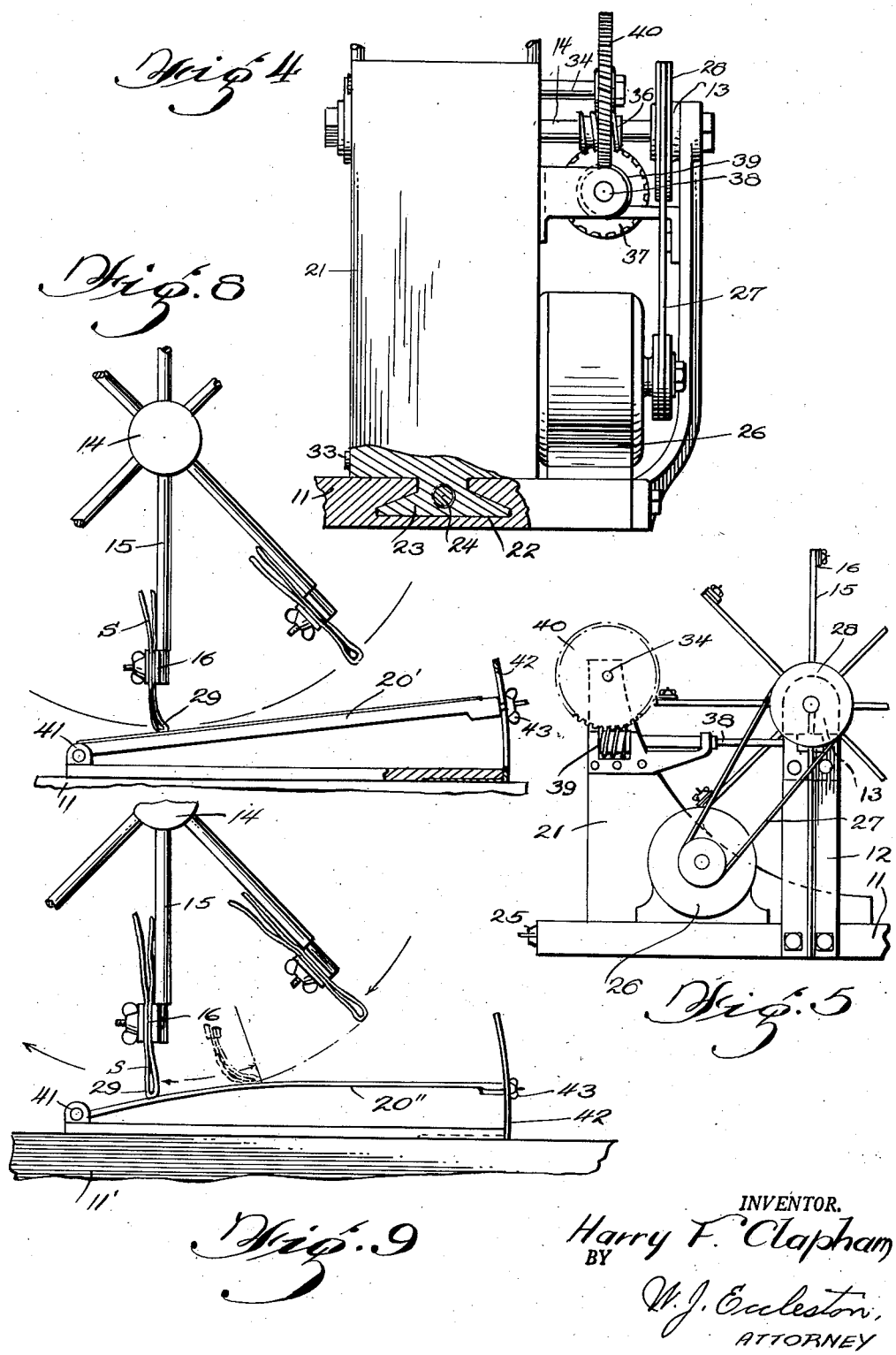

Patented Apr. 1, 1952

2,590,839

UNITED STATES PATENT OFFICE 2,590,839

FABRIC WEAR TESTER

Harry F. Clapham, Wilmington, Del.

Application November 20, 1946, Serial No. 711,077

9 Claims. (Cl. 73—7)

(Granted under the act of March 3, 1883, as amended April 30, 1928; 370 O. G. 757)

The invention described herein, if patented, may be manufactured and used by or for the Government for governmental purposes without the payment to me of any royalty thereon.

This invention relates to a machine for testing flexible material, and more particularly to a machine for the testing of the resistance of textile or similar material to wear and tear by abrasion, impact, and flexing.

The art is cognizant of numerous devices for the testing of the strength of textile and similar material and its resistance to abrasion. Such tests are important in order to predict the wearing qualities of the textile or similar material after it has been made into a finished article, such as a garment. While valuable data can be obtained by means of such devices, such data customarily relate only to a particular characteristic of the textile or similar material, such as its resistance against abrasion; conclusions as to its wearing qualities, as drawn from these data, thus are necessarily one-sided.

I have observed that accurate predictions of the wearing qualities of textile or similar material can be made from data relating to its resistance to the following factors: abrasion, impact, and flexing. These are factors which determine its life in a garment, and particularly in those portions of the garment subjected to the hardest wear and tear and consequently likely to wear out first, such as cuffs, seats, knee and elbow portions, etc. This observation has led me to the development of a machine capable of testing samples of textile or similar material for all three of these factors, and to compare the behavior of a number of samples of different materials in the course of one and the same testing operation.

It is thus an object of my invention to provide a machine for the testing of the resistance of textile and other flexible material against abrasion, impact, and flexing.

Another object of my invention is a machine for the testing of a sample of textile or similar material, which imitates the conditions of actual wear to which the material from which the sample is taken will be exposed during its useful life.

A further object of my invention is a textile-testing machine capable of testing a plurality of samples in a single testing operation.

Still another object of my invention is a machine for the testing of a plurality of samples of textile or similar material, having means for adjusting such samples so as to subject them to the test under equal conditions.

Yet another object of my invention is the provision of simple means in a textile-testing machine of the type in which artificial wear of the textile material is caused by an abrading surface, whereby such abrading surface may be constantly renewed so as to make tests independent of wear and tear sustained by the abrading surface itself.

My invention has also as an object the provision of a simple, sturdy and compact machine capable of accomplishing the foregoing objects.

Still other objects and purposes of my invention will appear in the course of the following description of several embodiments thereof.

A machine capable of testing samples of textile or similar material in accordance with my invention consists of a rotating hub, from which textile-sample-holding clamps extend radially, and an abrading surface placed in the path of such samples and against which such samples are impelled by the centrifugal motion imparted to them by the rotation of the hub and clamps.

The accompanying drawings illustrate a preferred embodiment of my invention and several modifications thereof. It must be understood, however, that the scope of my invention is not limited to the illustrated embodiments, and that such embodiments merely constitute examples of means by which the object of my invention may be realized.

In the drawings:

Fig. 1 is a perspective view of a testing machine in accordance with my invention;

Fig. 2 is a side view, partly in elevation and partly in section, of the machine illustrated in Fig. 1;

Fig. 3 is a plan view thereof; and

Fig. 4 is an end view thereof, partly in elevation and partly in section.

Fig. 5 is a simplified rear elevation of a machine illustrated in the preceding figures.

Fig. 6 is an elevation of a removable gage bar for the equalization of the size of the samples tested by the machine illustrated in the preceding figures.

Fig. 7 is a side elevation of one of a pair of brackets for the positioning of the gage bar illustrated in Fig. 6.

Figs. 8 and 9 are side views, partly in elevation and partly in section, of modifications of the abrasion means of the testing machine illustrated in Figs. 1 to 5.

More particularly, in one embodiment of my invention, reference numeral 11 denotes a base on which is mounted an upright 12 and bearing 13, carrying the horizontal rotary hub 14. Pairs of spokes or posts 15 extend radially from hub 14 and are spaced equidistantly from each other. Each pair of posts or spokes 15 supports at the free ends a clamp 16 paralleling the hub 14 and adapted to hold a sample of the flexible material S to be tested. Clamp 16 may be of any suitable construction and material; while I have illustrated clamps consisting of a fixed transverse bar 17 and a movable transverse bar 18 slightly shorter than fixed bar 17 and tightenable against fixed bar 17 by means of wingnuts 19, it will be understood that other clamp constructions, such as spring-metal clamps, may be substituted with equal advantage.

An abrasive surface 20 is preferably mounted on support 21, which in turn is mounted on base 11 in spaced relation from hub 14 and out of the path of the clamps 16 and spoke like clamp supports 15 radially extending therefrom, so that the latter may rotate freely. The spacing must be so set, however, that the flexible samples S, which are held by clamps 16, come in contact with abrasive surface 20 when hub 14 is rotating. In order to vary the conditions under which a test may be performed, I prefer to make the distance between abrasive surface 20 and clamps 16 adjustable. One illustrative manner to bring about such adjustment is shown in Figs. 2, 3 and 4 of the drawings; namely, a longitudinal recess 22 cut in base 11 along its longitudinal axis of symmetry, an abutment 23 interfitting therewith and integral with the bottom of support 21, and a threaded rod 24 tightenable by wingnut 25 for guiding the abutment 23 in recess 22 and for fixing its position therein at a desired location.

Rotation of hub 14, and consequently of clamps 16 and samples S, is caused by any desired means, among which I prefer an electric motor 26 connected by belt 27 to a pulley wheel 28 which is fast on hub 14. Uniform and easily adjustable speed is the principal advantage gained by the use of an electric motor; however, other conventional means to rotate hub 14 may be employed, including, for instance, a hand crank (not shown). Uniformity and adjustment of speed may be promoted by means of a conventional governor (not shown).

As has been mentioned, the rotation of hub 14 and clamp 16 causes samples S to come into contact with abrasive surface 20. This contact is in the nature of an impact, followed by a flexing of the sample, and an abrading by dragging the same over abrasive surface 20 (as is best seen in Fig. 2 of the drawings). The preferred manner of attaching the sample S to clamp 16 is to fold it so as to form a loop having an outwardly extending edge 29 which comes in initial contact with abrasive surface 20 with an impact whose strength depends on the centrifugal force imparted to the sample by the rotation of the sample-attaching means. The speed of rotation may be adjusted at will within wide limits; say, 30 revolutions per minute or less to 2,000 revolutions per minute or more. If the number of revolutions per minute is known, the number of impacts to which each sample is subjected can be easily calculated by multiplying the number of minutes of duration of the test by the number of revolutions per minute of hub 14. Comparative data for various materials can be secured by attaching different samples to clamps 16 and noting the number of contacts required to cause the failure of each sample. A sample may be said to fail either when a hole in worn through it or when its tensile strength or its bursting strength drops below a certain figure.

In order to obtain a fair comparison of the various samples, it is necessary to adjust them in such a manner that each sample protrudes equally from the clamp to which it is attached. Such an adjustment can be brought about by a gaging bar 30. Sample S is loosely clamped between long, fixed bar 17 and shorter, movable bar 18, and gaging bar 30 is slid into the loop formed by sample S. Gaging bar 30 is centered by means of a pair of H-shaped brackets 31 which are placed on either end of fixed bar 17; the upper recess of H-bracket 31 is slightly offset with relation to its lower recess, so that gaging bar 30, seated in the upper recess of H-bracket 31, is positioned in a plane between bars 17 and 18. A recess 32 of predetermined length is cut in gaging bar 30 to assure a uniform length of the edges 29 of all the samples S. Uniformity of the diameters of the loops of material S results from drawing the loops taut against the gaging bar and fixing them in that position by tightening the wingnuts 19. After this has been accomplished, H-brackets 31 are removed from fixed bar 17; and gaging bar 30, thus deprived of its supports, is released from its taut engagement with the loop and slides out easily.

To make the test still more accurate, I have provided means for a continuous renewal of abrasive surface 20. Abrasive surface 20 is itself subject to a slight abrading action by its contact with samples S, which, although small, nevertheless may cause slight discrepancies as the tests proceed. I therefore provide two shafts 33 and 34, journaled in support 21, over which runs an endless band of abrasive material 20. The textile-contacting surface of the abrasive material is guided in channels 35. A reduction gear connects the shaft of hub 14 and the shaft 34; it may consist of a worm 36 fast on the shaft of hub 14, a worm wheel 37 fast on one end of the telescoping shaft 38 and meshing with worm 36, a worm 39 on the other end of the telescoping shaft 38, and a worm wheel 40 fast on the shaft 34 and meshing with worm 39. Shaft 38 is horizontal and at right angles to the shaft of hub 14; it is telescoping, so that it may transmit power at any given position of adjustable support 21 which carries shaft 34. The speed reduction accomplished by the employment of the illustrated reduction gear causes a slow, continuous advancement of the abrasive surface, as hub 14 is rotated at a much greater speed. It must of course be understood that other speed-reduction gears can be easily designed for the accomplishment of the same object.

In my preferred embodiment illustrated in Figs. 1 to 5 and described above, I have provided a concavely curved abrasive surface for the purpose of prolonging the operative contact with the test samples which travel in a path substantially parallel to the curvature of the abrasive surface. In tests where such intimate contact is not desired (for instance, in tests to determine the impact strength of materials without regard for their resistance to abrasion by dragging), the abrasive surface may be flat, as the abrasive surface 20' in Fig. 8, or convex, as the abrasive surface 20'' in Fig. 9. There is but little dragging in either modification; and while there is some flexing, in addition to impact in the flat abrasive modification illustrated in Fig. 8, there is hardly any dragging or flexing when the convex abrasive surface of Fig. 9 is selected.

The modifications of Figs. 8 and 9 also illustrate alternate means for spacing the abrasive surfaces from the textile-sample-attaching means; namely, a pivot 41 mounted on base 11' and carrying one end of abrasive surface 20' (or 20''), the other end of the abrasive surface being tightenable in a slotted guide 42 by means of wingnut 43 or equivalent means. By adjusting the angle between abrasive surface and base, the distance between abrasive surface and test samples is likewise adjusted.

It will thus be seen that I have provided a simple and efficient apparatus for testing samples of textile or similar material, and a reliable method for testing of either a plurality of samples of the same material, or to compare the performance of different materials under conditions approximating those of actual wear. The data derived from tests with my method lend themselves to convenient compilation in the form of tables or graphs.

The foregoing description of a preferred embodiment of my testing machine and its operation, as well as a description of two modifications of my machine, clearly set forth the manner in which my invention may be practiced. Mechanical expedients for the accomplishment of the objects of my invention and equivalent to those described herein may be readily devised and are deemed to fall within the scope of my invention. I intend to claim my invention broadly, and to be limited only by the appended claims.

I claim:

1. A machine for testing textile material and the like, comprising a horizontal hub, means for imparting rotary motion to said hub, a rigid elongated support radially extending from said hub, a clamp at the outer terminal of said rigid elongated radial support for travel in a circular path, said clamp having a pair of reciprocable clamp jaws for holding the free ends of a folded sample or textile material with the bight of said sample protruding outwardly from said clamp, an abrasive surface spaced from said hub out of the path of said clamp and in the path of travel of the bight of said textile sample, whereby upon rotation of said hub said textile sample is impelled by centrifugal force against said abrasive surface.

2. A machine for testing textile material and the like, comprising a horizontal hub, means for imparting rotary motion to said hub, a plurality of rigid elongated supports radially extending from said hub, a plurality of equidistantly spaced clamps at the outer termini of said rigid elongated radial supports for travel in a circular path, each of said clamps having a pair of reciprocable clamp jaws for holding the free ends of folded samples of textile material with the bights of said samples protruding outwardly from said clamps, an abrasive surface spaced from said hub out of the path of said clamps and in the path of travel of the bights of said textile samples, whereby upon rotation of said hub said textile samples are impelled by centrifugal force against said abrasive surface.

3. A machine for testing textile material and the like, comprising a horizontal hub, means for imparting rotary motion to said hub, a plurality of rigid elongated supports radially extending from said hub, textile-holding means at the outer termini of said rigid elongated radial supports for travel in a circular path, said textile-holding means comprising a plurality of equidistantly spaced clamps, each of said clamps having a pair of reciprocable clamp jaws for holding the free ends of a folded sample of textile material with the bight of said sample protruding outward from said clamp, an abrasive surface spaced from said hub out of the path of said textile-holding means and in the path of travel of textile material protrudingly held by and radially extending from said textile-holding means under the influence of centrifugal force imparted to said textile material by the rotation of said hub, and means for angular adjustment of the plane of said abrasive surface within the range of travel of said textile material; whereby upon rotation of said hub said textile material is impelled by centrifugal force against and is dragged over said abrasive surface for a predetermined distance.

4. A machine for testing textile material and the like, comprising a base, a hub horizontally mounted on said base, means for imparting rotary motion to said hub, a plurality of rigid elongated supports radially extending from said hub, textile-holding means at the outer termini of said rigid elongated radial supports for travel in a circular path, said textile-holding means comprising a plurality of equidistantly spaced clamps, each of said clamps having a pair of reciprocable clamp jaws for holding the free ends of a folded sample of textile material with the bight of said sample protruding outward from said clamp, a pivot horizontally mounted on said base, an abrasive surface connected to said pivot, said abrasive surface being spaced from said hub out of the path of travel of said textile-holding means and in the path of travel of textile material protrudingly held and radially extending from said textile-holding means under the influence of centrifugal force imparted to said textile material by the rotation of said hub, and adjustment means spaced from said pivot for varying the angle of said abrasive surface relative to said base.

5. A machine for testing textile material and the like, comprising a horizontal hub, means to impart rotary motion to said hub, a plurality of rigid elongated supports radially extending from said hub, textile-holding means at the outer termini of said rigid elongated radial supports for travel in a circular path, said textile-holding means comprising a plurality of equidistantly spaced clamps, each of said clamps having a pair of reciprocable clamp jaws for holding the free ends of a folded sample of textile material with the bight of said sample protruding outward from said clamp, a concavely curved abrasive surface spaced from said hub out of the path of said textile-holding means and in the path of travel of textile material protrudingly held by and radially extending from said textile-holding means under the influence of centrifugal force imparted to said textile material by the rotation of said hub, whereby upon rotation of said hub said textile material is impelled by centrifugal force against and is dragged over said abrasive surface.

6. A machine for testing textile material and the like, comprising a horizontal hub, means to impart rotary motion to said hub, a plurality of rigid elongated supports radially extending from said hub, textile-holding means at the outer termini of said rigid elongated radial supports for travel in a circular path, said textile-holding means comprising a plurality of equidistantly spaced clamps, each of said clamps having a pair of reciprocable clamp jaws for holding the free ends of a folded sample of textile material with the bight of said sample protruding outward from said clamp, a convexly curved abrasive surface spaced from said hub out of the path of said textile-holding means and in the path of travel of textile material protrudingly held by and radially extending from said textile-holding means under the influence of centrifugal force imparted to said textile material by the rotation of said hub; whereby upon rotation of said hub said textile material is impelled by centrifugal force against said abrasive surface to make point contact therewith without substantial dragging.

7. A machine for testing textile material and the like, comprising a horizontal hub, means to impart rotary motion to said hub, textile-holding means radially spaced from said hub for travel in a circular path, an endless continuously advancing abrasive band spaced from said hub out of the path of said textile-holding means and in the path of travel of textile material protrudingly held by and radially extending from said textile-holding means under the influence of centrifugal force imparted to said textile material by the rotation of said hub, and a pair of curved channels for guiding said endless band to present a curved surface to said textile material whereby upon rotation of said hub said textile material is impelled by centrifugal force against and is dragged over the curved surface of said endless band.

8. A machine for testing textile material and the like, comprising a horizontal hub, means to impart rotary motion to said hub, a plurality of rigid elongated supports radially extending from said hub, a plurality of equidistantly spaced clamps at the outer termini of said rigid elongated radial supports, each of said clamps having a pair of reciprocable clamp jaws for holding the free ends of folded samples of textile material with the bights of said samples protruding outwardly from said clamps, and an endless continuously advancing abrasive band spaced from said hub out of the path of said clamps and in the path of travel said textile materials protrudingly held by and radially extending from said clamps under the influence of centrifugal force imparted to said textile materials by the rotation of said hub, whereby upon rotation of said hub said textile materials are impelled by centrifugal force against and are dragged over the abrasive surface of said endless band.

9. A machine for testing textile material and the like, comprising a horizontal hub, means to impart rotary motion to said hub, a plurality of rigid elongated supports radially extending from said hub, textile-holding means at the outer termini of said rigid elongated radial supports for travel in a circular path, an endless continuously advancing abrasive band spaced from said hub out of the path of said textile-holding means and in the path of travel of textile material protrudingly held by and radially extending from said textile-holding means under the influence of centrifugal force imparted to said textile material by the rotation of said hub, and a pair of curved channels for guiding said endless band to present a concavely curved surface to said textile material, whereby upon rotation of said hub said textile material is impelled by centrifugal force against and is dragged over the concavely curved surface of said endless band.

HARRY F. CLAPHAM.

REFERENCES CITED

The following references are of record in the file of this patent:

UNITED STATES PATENTS

| Number | Name | Date |
| --- | --- | --- |
| 1,350,458 | Hokanson | Aug. 24, 1920 |
| 1,669,622 | Messer | May 15, 1928 |
| 2,010,049 | Abbott | Aug. 6, 1935 |
| 2,367,838 | Allen | Jan. 23, 1945 |

FOREIGN PATENTS

| Number | Country | Date |
| --- | --- | --- |
| 143,749 | Switzerland | Nov. 30, 1930 |
| 394,154 | Germany | Apr. 23, 1924 |

OTHER REFERENCES

"Mechanical Walker Tests Shoe Soles," an article on page 29 of Popular Science Magazine, January 1936.